United States Patent [19]
Ikeda et al.

[11] Patent Number: 5,861,454
[45] Date of Patent: Jan. 19, 1999

[54] RUBBER COMPOSITION CONTAINING CARBON FIBRILS AND A PNEUMATIC TIRE

[75] Inventors: Hiroharu Ikeda, Machida; Naoya Ogata, Tokyo, both of Japan; Robert Hausslein, Lexington, Mass.; David Moy, Winchester, Mass.; Chun Ming Niu, Sommerville, Mass.

[73] Assignee: Hyperion Catalysis Int'l, Cambridge, Mass.

[21] Appl. No.: 612,924

[22] PCT Filed: Sep. 9, 1994

[86] PCT No.: PCT/US94/10168

§ 371 Date: Aug. 24, 1996

§ 102(e) Date: Aug. 24, 1996

[87] PCT Pub. No.: WO95/07316

PCT Pub. Date: Mar. 16, 1995

[30] Foreign Application Priority Data

Sep. 10, 1993  [JP]  Japan .................................. 5-226044

[51] Int. Cl.$^6$ ........................................................ C08K 3/00
[52] U.S. Cl. ........................................... 524/495; 524/496
[58] Field of Search ..................................... 524/495, 496

[56] References Cited

U.S. PATENT DOCUMENTS 5,124,075  6/1992  Yasuda et al. ........................... 252/511
5,304,326  4/1994  Goto et al. ............................... 252/511

*Primary Examiner*—Edward J. Cain
*Attorney, Agent, or Firm*—Whitman, Breed Abbott & Morgan LLP

[57] ABSTRACT

A rubber composition containing carbon fibrils in which 0.5 to 60 parts by weight of carbon fibril material comprised primarily of an aggregate of fibrils having an average particle diameter of 0.05 to 50 microns in which fine, filiform carbon fibrils of 3.5 to 75 nm in diameter are intertwined with each other is mixed with 99.5 to 40 parts by weight of synthetic rubber and/or natural rubber and a pneumatic tire in which the surface layer is provided with this rubber composition.

2 Claims, 8 Drawing Sheets

RUBBER COMPOSITION CONTAINING CARBON FIBRILS AND A PNEUMATIC TIRE

FIELD OF THE INVENTION

This invention relates to a novel rubber composition of superior hardness and strength. More particularly, this invention relates to a rubber composition containing carbon fibrils in which specified carbon fibrils are compounded with synthetic rubber and/or natural rubber and to tires in which the composition is used.

BACKGROUND OF THE INVENTION

Concerns over the limited oil resources in recent years has let to the imposition of certain fuel cost standards in an effort to bring about improvement in controlling automobile fuel costs. In order to meet the strict standards of the future, it will be necessary to improve existing materials and technology. One method is to reduce the weight of the tire itself, which would be effective in bringing about great improvement in automobile fuel costs.

Lowering the specific gravity of the rubber component that forms the tire can be considered. From this standpoint, it would be desirable to effect a great decrease in the quantity of use of carbon black, which has a high specific gravity. Carbon black has approximately twice the specific gravity as that of rubber. However, when the quantity of carbon is decreased, hardness, tensile strength and modulus during low extension are decreased and wear resistance is insufficient.

Another way of lowering the weight of the tire that has been considered is to decrease the size of the tire. However, when the tire is made smaller, the strength of the tire cannot be maintained. When the quantity of carbon black that is used is increased, hardness is increased. However, increase in strength is not sufficient. When an ever larger amount of carbon black is used, strength is decreased, the processing capacity of the rubber composition becomes poor and heat generated from vulcanized rubber is increased. In addition, there are the problems that the specific gravity of the rubber composition increases and the weight of the tire increases.

Consequently, it is desirous to have a reinforcing material which has a greater reinforcing capacity than conventional carbon black and that has greater hardness and wear resistance when used in small quantities. Most recently, fine, filiform carbon fibrils have been developed and it has been discovered that rubber compositions having hardness and good tensile strength and wear resistance can be obtained by addition of small amounts of reinforcing material. However, problems such as deterioration in the physical properties, and, of tensile strength in particular, of these rubber compositions at high temperatures remain.

OBJECTS OF THE INVENTION

It is therefore a general object of the invention to provide a rubber composition that has a low specific gravity.

It is a further object of the invention to provide a rubber composition having a high degree of hardness, tensile strength and modulus.

It is a yet another object to provide a rubber composition having a high wear resistance.

It is another object to provide a pneumatic tire in which the surface layer of the tire is composed of a rubber composition having a low specific gravity, high degree of hardness, tensile strength and modulus, and a high wear resistance.

These and other objects, features and advantages of the invention will become readily apparent from the ensuing description, and the novel features will be particularly pointed out in the appended claims.

SUMMARY OF THE INVENTION

The invention is broadly directed to a rubber composition containing carbon fibrils in which 0.5 to 60 parts by weight of carbon fibril material comprised primarily of an aggregate having an average particle diameter of 0.05 to 50 $\mu$m in which fine, filiform carbon fibrils of 3.5 to 75 nm in diameter are intertwined with each other is mixed with 99.5 to 40 parts by weight of synthetic rubber and/or natural rubber.

The invention is also broadly directed to a pneumatic tire in which the surface layer of the tire is provided with the rubber composition as described.

BRIEF DESCRIPTION OP THE DRAWINGS

The invention will be understood more clearly and fully from the following detailed description, when read with reference to the accompanying figures, in which.

DETAILED DESCRIPTION OF THE INVENTION

Figure 1:
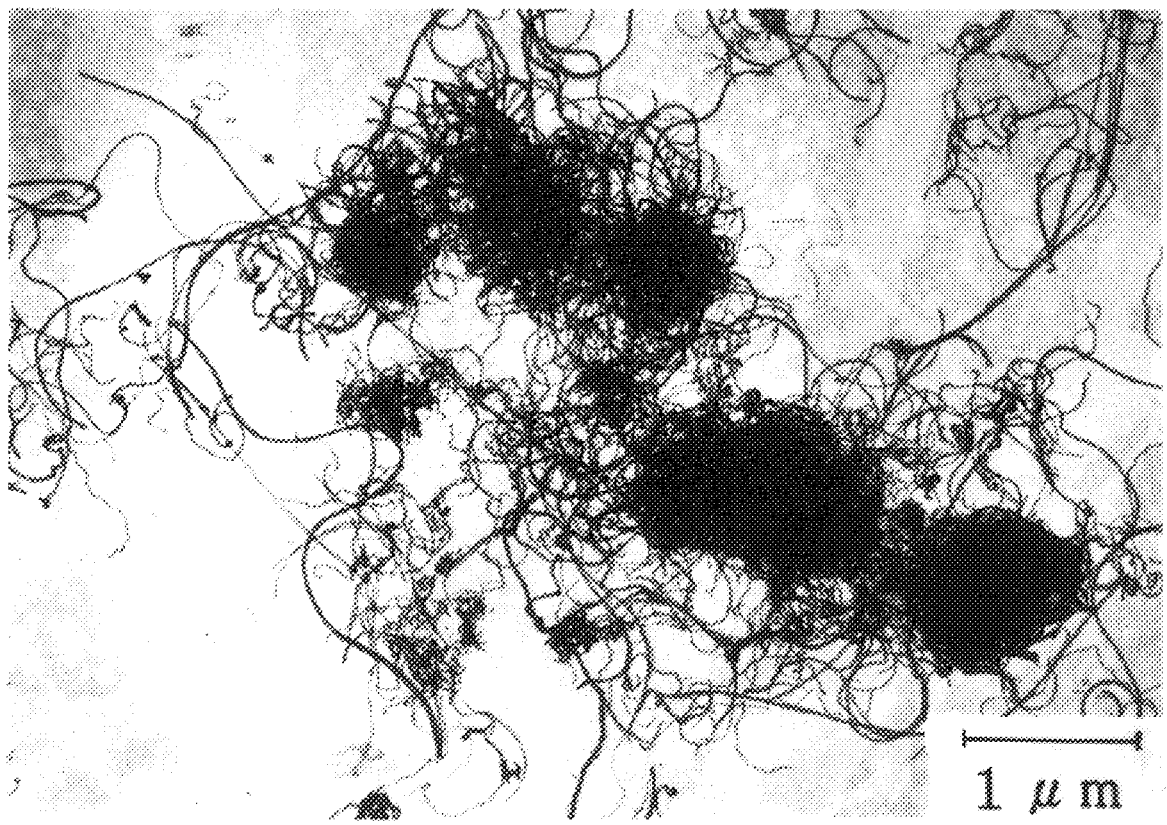
FIG. 1 shows TEM (transmission electron microscope) image of the carbon fibril material used in the manufacture of the rubber composition of this invention.

The invention is broadly directed to a rubber composition containing carbon fibrils and is mixed with synthetic and/or natural rubber.

A rubber composition containing specified carbon fibrils is disclosed in Japanese Patent Disclosure No. 2-235945 [1990] as a means of solving the aforementioned problems. That disclosure indicated the diameter of the aggregate of carbon fibrils is 0.10 to 0.25 mm and the rupture strength $T_B$ of the rubber sheet that is obtained is decreased at smaller diameters.

However, the inventors of this invention, who conducted further intensive and repeated research, discovered as a result that the dispersibility of the carbon fibril material and the external appearance of the compact surface could be improved without impairing the $T_B$ and $H_S$, even when the average particle diameter of the carbon fibril aggregate was even smaller. It was further ascertained that the conductive properties of the rubber composition could be improved and that equal resistance values could be obtained by means of a small quantity of carbon fibril material.

As a result of research for the purpose of applying the results of the foregoing study industrially, it was discovered that rubber compositions in which a specified carbon fibril material was compounded in a suitable quantity with any commercial synthetic rubber and/or natural rubber are of superior processing capacity and that they form a vulcanized rubber of high hardness and of superior tensile strength and wear resistance as a result of vulcanization.

The essential aspects of this invention are that it is a rubber composition containing carbon fibrils in which 0.5 to 60 parts by weight of carbon fibril material comprised primarily of an aggregate of fibrils having an average particle diameter of 0.05 to 50 μm in which fine, filiform carbon fibrils of 3.5 to 75 nm in diameter are intertwined with each other is mixed with 99.5 to 40 parts by weight of synthetic rubber and/or natural rubber and that pneumatic tire in which the surface layer of the tire is provided with this rubber composition.

Here, the tire surface layer refers to the tread, the side wall or various types of covering rubber. In tread that is comprised of several layers, the tread includes not only the outside layer of tread, but also the inside layer of tread that is exposed on the surface of the tire after it has run. In this invention, the aforementioned rubber composition should be provided with a tread.

The term "90% diameter" is used in the explanation of this invention. It is defined as follows.

The distribution obtained by taking d as particle diameter and the volumetric ratio of particle diameter Vd as the probability variable is called the particle size distribution D. When the minimum particle diameter in the particle size distribution D is taken as dmin and the maximum particle diameter is taken as dmax, the average particle diameter dm satisfies the following formula.

Formula 1:

$$0.5 = \sum_{dmin}^{dm} Vd \text{ or } 0.5 = \sum_{dm}^{dmax} Vd$$

In addition, "90% diameter" $d_{90}$ satisfies the following formula:

Formula 2:

$$0.9 = \sum_{dmin}^{d90} Vd$$

The carbon fibril material that is used in this invention is comprised of an aggregate of an average particle diameter of 0.05 to 50 μm in which fine, filiform carbon fibrils of 3.5 to 75 nm in diameter are intertwined with each other. The average particle diameter of the aggregate should be 0.2 to 30 μm, and, preferably, 0.5 to 20 μm.

The particle size distribution of the aggregate in this invention is as follows. Specifically, 90% diameter as defined previously should ordinarily be less than 100 μm, preferably, less than 80 μm, and, more preferably, less than 50 μm. Further, 90% diameter should be less than 7.5 times the average particle diameter.

When the average particle diameter of the aggregate exceeds 50 m, the carbon fibril material in the rubber composition is poorly dispersed, the tensile strength of the vulcanized material is decreased and the external appearance of the molded compact is impaired. Manufacture is difficult when the average particle diameter is less that 0.05 m.

The proportion of aggregate in the carbon fibril material should be greater than 30%, and, preferably, greater than 50%.

The carbon fibrils that form the carbon fibril aggregate are filaments of which the variation in diameter should be less than 15% of the average diameter of several tens of samples and of which the aspect ratio should ordinarily be greater than 5, preferably, greater than 100, and, more preferably, greater than 1000. Moreover, they should ordinarily be tubular fibrils with hollow cores.

Moreover, the carbon fibrils should have several graphite layers that are parallel to the fibril axis and should not have a continuous thermal carbon coating. The proportion of the surface area that is coated by the thermal carbon coating should ordinarily be less than 50%, preferably, less than 25%, and, more preferably, less than 5%.

The surfaces of carbon fibrils which have been denatured can be used. Denaturing can be performed, for example, by chemical reactions, such as oxidation and by procedures such as coating with polymers, like epoxy resins.

The carbon fibrils that are used in this invention should be partially oxidized carbon fibrils in which the relative ration of $C_{IS}$ and $O_{IS}$ ($C_{IS}/O_{IS}$) as determined by X-ray photoelectron spectrometry is in the range of 92/8 to 98/2. When the ratio is less than 92/8, dispersion in the rubber is not sufficient, causing the tensile strength of the vulcanized rubber to decreased. When the ratio of $C_{IS}$ and $O_{IS}$ is greater than 98/2, the tensile strength after maintenance at high temperatures is decreased. This type of rubber composition is suited for use in automobile tires and passenger automobile tires in particular.

The proportion of carbon fibril material in the composition of this invention should be 0.5 to 60% by weight, preferably, 1 to 50% by weight, and, more preferably, 5 to 40% by weight. In tires, the proportion of carbon fibrils should be 15 to 60% by weight, and, preferably, 20 to 50% by weight. In tires, the proportion of carbon fibrils should be 15 to 60% by weight, and, preferably, 20 to 50% by weight. When it is less than 0.5% by weight, the effect attributable to the carbon fibril material is not manifested. When it exceeds 60% by weight, there are the drawbacks that the processing capacity of the composition is markedly poor and that the hardness of vulcanized composition is excessively great.

The method of manufacturing the carbon fibrils that are used in this invention is described in Japanese Patent Application 2-503334 [1990]. A specific example is described below.

The carbon fibrils are manufactured in a vertical tubular reactor by introducing catalyst particles containing metal into a gas flow containing carbon by means of its own weight or by injection of a gas such as an inert gas. The reaction temperature is 550° to 1200° C. The catalyst particles may be formed in the reaction vessel by decomposition of a precursor compound, for example, ferrocene. An internal plug of quartz wool for catching the catalyst particles and a quartz tube equipped with a thermocouple for monitoring the temperature of the reaction vessel are used in the reaction vessel. In addition, it is equipped with an inlet port for introducing the catalyst, the reaction gas and a purge gas such as argon and with an outlet port for removing the gas from the reaction vessel.

Suitable gases containing carbon include saturated hydrocarbons, for example, methane, ethane, propane, butane, hexane and cyclohexane, unsaturated hydrocarbons, for example, ethylene, propylene, benzene and toluene, hydrocarbons containing oxygen, for example, acetone, methanol and tetrahydrofuran and carbon monoxide. The preferable gases are ethylene and propane. Preferably, hydrogen gas is added. Typically, the ratio of gas containing carbon to hydrogen gas is in the range of 1:20 to 20:1.

Desirable catalysts include iron, molybdenum-iron, chromium-iron, cerium-iron and manganese-iron particles attached to deposited alumina.

In order to cause the fibrils to grown, the reaction tube is heated to 550° to 1200° C., and, at the same time, purging is performed with, for example, argon. When the reaction tube reaches a specified temperature, introduction of the hydrogen flow and the flow of gas containing carbon is begun. A hydrogen flow volume of approximately 100 millimeters/minute and a flow of gas containing carbon of approximately 200 millimeters/minute are suitable for a reaction tube of 1 inch in length. After the reaction tube has been purged for over 5 minutes with the reaction gases at the aforementioned flow volumes, the catalyst is dropped onto the quartz wool plug. Next, the reaction gases are reacted with the catalyst (typically for 0.5 to 1 hour) throughout the entire body of the reaction vessel. When the reaction period is completed, the flow of reaction gases is stopped, purging is effected with a gas not containing carbon, for example, argon, the reaction vessel is cooled to room temperature and the fibrils are recovered from the reaction tube. The yield of fibrils is greater than 30 times the iron content of the catalyst.

The carbon fibril material that is used in this invention consists of carbon fibrils in unaltered form manufactured as described above, or, in many cases, is obtained by pulverizing them to a specified size. The pulverization apparatus may be, for example, a pneumatic grinder (jet mill) or an impact grinder. Because these grinders can be operated continuously and the quantity treated per unit time is greater than with a ball mill or a vibrating mill, pulverization costs can be lowered. In addition, a uniform carbon fibril aggregate of a narrow particle size distribution can be obtained by installing a classifying mechanism in the grinder or by installing a classifier such as a cyclone in the line.

The partially oxidized carbon fibrils that are used in this invention can be manufactured using carbon fibrils as the carbon fibrils and by oxidizing their surfaces. They can be manufactured by gaseous phase oxidation at normal temperature or high temperatures with such oxidating gases as air, oxygen, ozone, water vapor and plasma and by liquid phase oxidation with concentrated nitric acid, potassium permanganate, potassium dichromate and sodium hypochlorite. To prevent environmental contamination, gaseous phase oxidation is preferably conducted with an industrial oxidizing gas. Manufacture can be carried out by combining the oxidation treatment process with the process of manufacturing the carbon fibrils. These oxidation treatments can also be carried out after the raw material carbon fibrils have been pulverized.

FIG. 1 shows an example of the carbon fibril material that is used in this invention. The portions that are shaded in black are the carbon fibril aggregate obtained as described above. The matter that appears as lines is the fibrils themselves.

The synthetic rubbers that are used in this invention include polyisoprene rubber, polybutadiene rubber, butadiene-styrene copolymer rubber, butadiene-acrylonitrile copolymer rubber, polychloroprene rubber, ethylene-olefinic copolymer rubber, ethylene-acrylic copolymer rubber, ethylene-vinyl acetate copolymer, acrylic rubber, epichlorohydrin rubber, halogenated polyethylenes, cholorsulfonated polyethylenes, silicone rubber, fluorine rubber and phosphazene rubber.

Modified substances obtained by adding maleic acid anhydride, α, β-unsaturated carboxylic acids and esters thereof, various types of vinyl compounds and acenaphthylene to the aforementioned rubbers and modified substances obtained by hydrogenating those of the aforementioned rubbers having unsaturated groups in the polymer main chain can also be cited.

Diene polymers, specifically, polybutadiene rubber, butadiene-styrene copolymer rubber and polyisoprene rubber can be used suitably in tires.

The vinyl content of the butadiene component of the (co)polymer in the butadiene rubber compound should be greater than 15%, preferably, greater than 20%, and, more preferably, greater than 30%. From the standpoints of manufacture and effect, it should be less than 90%.

When it is less than 15%, it is difficult to improve wet skid characteristics and roll friction resistance characteristics are improved, roll friction resistance characteristics at the same time. That is, when wet skid characteristics are impaired, and, when roll friction resistance characteristics are improved, wet skid characteristics are impaired.

The glass transition temperature (Tg) of the aforementioned butadiene (co)polymers should be greater than −70° C., and, preferably, greater than −60° C. For effectiveness, it should be less than −30° C. When the glass transition temperature is less than said temperature, wet skid characteristics are impaired. This is not desirable. The glass transition temperatures (Tg) indicates values determined by DSC. In this connection, the value for Li butadiene rubber of a 12% vinyl bond content is −180° C., the value for natural rubber is −76° C. and the value for styrene-butadiene copolymer rubber (SBR #1500: brand name) obtained by emulsion polymerization is −64° C.

Conjugated diene (co)polymers that are desirable for use in tires can be obtained by subjecting a conjugated diene alone or a conjugated diene together with one or more other conjugated dienes or aromatic vinyl compounds to solution polymerization, after which the product is reacted with a reactive compound such as an isocyanate compound.

Styrene-butadiene copolymers having a styrene content of greater than 5% are particularly desirable because they exhibit excellent wet skid characteristics and roll friction resistance characteristics and because they are also of superior tensile strength and processing capacity.

Although there are no particular limitations on the aforementioned styrene content, it should be less than 50% by weight, and, preferably, less than 45% by weight.

Additives, vulcanization accelerators, auxiliary vulcanization accelerators, aging inhibitors, softeners and fillers that are commonly used in the rubber industry can be compounded with the rubber composition of this invention.

Further, as required, fillers such as carbon black, silica, diatomaceous earth, pulverized quartz, talc, clay, mica, calcium silicate, magnesium silicate, glass powder, calcium silicate, magnesium silicate, glass powder, calcium carbonate, barium sulfate, zinc carbonate, titanium oxide, alumina, glass fibers, other types of carbon fibers and organic fibers and known additives such as softeners, plasticizers, auxiliary processing agents, lubricants, aging inhibitors and ultraviolet ray absorbents can also be added.

These compounding substances can be kneaded with kneading machines that are commonly used such as rolling machines and Bumbury mixers, after which molding and vulcanization can be carried out under ordinary conditions for manufacturing vulcanized rubber.

Mixing of the carbon fibril material of this invention and the rubber can be carried out by the wet master batch method.

The invention will be more fully described and understood with reference to the following examples which are given by way of illustration.

In determination of the diameter of the aggregate of the carbon fibril material, the carbon fibrils were first added to water to which a surfactant had been added and were dispersed using an ultrasonic homogenizer. Following that, the carbon fibril dispersion was analyzed using a laser diffraction scattering type particle size distribution meter and the particle diameter of the aggregate was determined.

Compounding for the purpose of vulcanization tests in the examples and comparative examples was as indicated in Table 1 through Table 3. The unit of compounding was parts by weight in all cases. Carbon fibrils or HAF carbon (high reinforcing carbon black) were added to the compounding materials based on compounding formulation 1 and compounding formulation 2 in Table 1 by compounding as indicated in Table 2 and Table 3. As specified in Table 2 and Table 3, the types of rubbers were SBR rubber and EP rubber.

Table 2 and Table 3 also show the properties of the carbon fibril material and the test results for the examples and comparative examples.

TABLE 1

|  | Compounding 1 | Compounding 2 |
| --- | --- | --- |
| Rubber (SBR rubber or EP rubber) | 100 | 100 |
| Carbon fibrils | * | * |
| HAF carbon (ASTM 330) | * | * |
| Stearic acid | 2 | 1 |
| Zinc white | 3 | 5 |
| N-butyl-N-isopropyl-p-phenylenediamine | 2 | — |
| Diphenylguanidine | 1 | — |
| Dibenzothiazole disulfide | 0.6 | — |
| N-cyclohexyl-2-benzothiazole disulfide | — | 1.5 |
| Dipentamethylene thiuram tetrasulfide | — | 0.75 |
| Tellurium diethyl dithiocarbamate | — | 0.75 |
| Sulfur | 1.5 | 1.5 |

Cases marked with * were compounded as indicated in Table 2 and Table 3.

TABLE 2

|  | Example 1 | Comparative Example 1 | Example 2 | Comparative Example 2 | Example 3 | Comparative Example 3 | Example 4 | Comparative Example 4 | Comparative Example 5 |
| --- | --- | --- | --- | --- | --- | --- | --- | --- | --- |
|  | 1 | 1 | 2 | 2 | 1 | 1 | 1 | 1 | 1 |
| Carbon fibril properties |  |  |  |  |  |  |  |  |  |
| Diameter (nm) | 13 | — | 13 | — | — | — | 13 | — | 13 |
| Average particle diameter of aggregate ($\mu$m) | 3.5 | — | 3.5 | — | — | — | 7.4 | — | 80 |
| Aggregate 90% diameter ($\mu$m) | 8.2 | — | 8.2 | — | — | — | 34 | — | 240 |
| Compounding |  |  |  |  |  |  |  |  |  |
| Carbon fibrils | 30 | — | 40 | — | 3 | — | 35 | — | 30 |
| HAF carbon (ASTM N-330) | — | 70 | — | 40 | — | 3 | — | 100 | — |
| SBR rubber | 100 | 100 | — | — | 100 | 100 | 100 | 100 | 100 |
| EP rubber | — | — | 100 | 100 | — | — | — | — | — |
| Results of evaluation |  |  |  |  |  |  |  |  |  |
| Roll processing capacity | good | good | good | good | average | average | good | poor | poor |
| Properties of vulcanized material |  |  |  |  |  |  |  |  |  |
| Hardness ($H_S$) (JIS-A) | 83 | 81 | 93 | 75 | 56 | 45 | 88 | 98 | 79 |
| Tensile strength ($T_B$)(kgf/cm$^2$) | 222 | 220 | 224 | 206 | 102 | 76 | 241 | 110 | 125 |
| Pico wear (index) | 100 | 78 | — | — | 56 | — | — | 98 | — |
| DIN wear (mg) | 118 | 135 | — | — | — | — | 85 | — | 134 |
| Volumetric intrinsic viscosity ($\Omega$cm) | $3.0 \times 10$ | $2.0 \times 10^3$ | $3.1 \times 10^3$ | over $10^7$ | $1.2 \times 10^3$ | over $10^7$ | $1.0 \times 10^0$ | $5.8 \times 10^2$ | $7.6 \times 10$ |

TABLE 3

|  | Example 5 | Example 6 | Example 7 | Comparative Ex. 6 | Comparative Ex. 1 |
| --- | --- | --- | --- | --- | --- |
| Type of Compounding | 1 | 1 | 1 | 1 | 1 |
| Carbon fibril properties |  |  |  |  |  |
| $C_{IS}/O_{IS}$ | 97/3 | 95/5 | 97/3 | 99/1 | — |
| Diameter (nm) | 12 | 12 | 12 | 13.5 | — |
| Average particle diameter of aggregate ($\mu$m) | 2.9 | 2.9 | 2.9 | 3.2 | — |
| Compounding |  |  |  |  |  |
| Carbon fibrils | 30 | 30 | 40 | 30 | — |
| HAF carbon (ASTM N-30) | — | — | — | — | 75 |
| SBR rubber | 100 | 100 | 100 | 100 | 100 |

TABLE 3-continued

|  | Example 5 | Example 6 | Example 7 | Comparative Ex. 6 | Comparative Ex. 1 |
|---|---|---|---|---|---|
| Results of evaluation | | | | | |
| Roll processing capacity | good | good | good | good | good |
| Properties of vulcanized material | | | | | |
| Hardness ($H_S$) (JIS-A) | 84 | 85 | 93 | 83 | 85 |
| After 48 hours at 100° C. | 89 | 89 | 96 | 92 | 92 |
| Tensile strength (TB) (kgf/cm$_2$) | 226 | 225 | 247 | 223 | 218 |
| After 48 hours at 100° C. | 180 | 182 | 181 | 161 | 160 |
| Pico wear (index) | 100 | 100 | 112 | 99 | 81 |
| DIN wear (mg) | 116 | 112 | 84 | 118 | 133 |

EXAMPLE 1

An aggregate of an average particle diameter of 3.5 μm and a 90% diameter as described previously of 8.2 μm in which fine, filiform tubular graphitic carbon fibrils of an average diameter of 13 nm were intertwined were used as the carbon fibril material.

This was compounded on the basis of compounding formulation 1 and compounding formulation 2 as shown in Table 1 in accordance with the compounding conditions described in Table 2. SBR 1502 manufactured by Japan Synthetic Rubber was used as the SBR rubber. The compounded material was kneaded using a laboplast mill and a roller, after which vulcanization was carried out for 30 minutes at 145° C., with a rubber sheet of approximately 2 mm in thickness being obtained.

Tests were carried out in accordance with the tensile test method for vulcanized rubber specified in JIS K6301 and the for hardness ($H_S$) and rupture strength ($T_B$) shown in Table 2 were obtained. Pico wear tests as specified in ASTM D-2228 were carried out wear resistance was expressed by an index obtained by taking the values in Table 1 as 100.

COMPARATIVE EXAMPLE 1

Tests were conducted in the same way as in Example 1 except that 70 parts of HAF carbon (ASTM No. N-330) was used instead of 30 parts of carbon fibrils.

When Example 1 and Comparative Example 1 were compared, it was found that hardness and tensile strength equal to that with HAF carbon was obtained with approximately half the quantity carbon fibrils. Wear resistance was also superior.

EXAMPLE 2 AND COMPARATIVE EXAMPLE 2

Tests were carried out in the same way as in Example 1 except that EP rubber (EP21 manufactured by Japan Synthetic Rubber) was used in compounding formulation 2 in Table 1 and that carbon fibrils and HAF carbon were used as in Example 1 and Comparative Example 1, respectively.

In EP rubber as well, carbon fibrils were more effective in increasing hardness than HAF carbon. Volumetric intrinsic resistance was approximately 1/10,000 in Example 2. Thus, carbon fibrils were extremely good in increasing conductivity.

EXAMPLE 3

Tests were conducted in the same way as in Example 1, except that 3 parts of carbon fibrils was used.

COMPARATIVE EXAMPLE 3

Test were carried out in the same way as in Comparative Example 1 except that 3 parts of HAF carbon was used. From a comparison of Example 3 and Comparative Example 3, it was found that carbon fibrils in small amounts had the effect of bringing about marked decreases in the volumetric intrinsic resistance of vulcanized rubber.

EXAMPLE 4

An aggregate of an average particle diameter of 7.4 μm and a 90% particle diameter as described previously of 34 μm in which fine, filiform tubular graphitic carbon fibrils of 13 nm in average diameter were intertwined was used as the carbon fibril material. This aggregate was tested in the same way as in Example 1 using compound formulation 1 in Table 1 and under the compounding conditions of Table 2.

The quantity of carbon fibrils was increased by 5 parts by comparison to Example 1, for which reason there was high hardness and tensile strength as well as high conductivity. There was little wear.

COMPARATIVE EXAMPLE 4

Tests were carried out in the same way as in Comparative Example 2 except that 100 parts carbon were used. Roller processing capacity was poor and tensile strength was also low.

COMPARATIVE EXAMPLE 5

An aggregate of an average particle diameter of 80 μm and a 90% particle diameter as described previously of 240 μm in which fine, filiform tubular graphitic carbon fibrils of 13 nm in average diameter were intertwined was used as the carbon fibril material. This aggregate was tested in the same way as in Example 1 using compound formulation 1 in Table 1 and was compounded as indicated in Table 2. Roller processing capacity was poorer and tensile strength was lower than in Example 1, in which the same quantity of carbon fibrils was compounded. Conductivity was inferior to that in Example 1.

EXAMPLES 5 TO 7

Concentrated nitric acid was added to the carbon fibrils of Example 1, the materials were heated, a reaction was carried out under reflux and carbon fibrils of different degrees of oxidation was prepared. Table 3 shows their shapes and properties.

These fibrils were compounded as indicated in the column for compounding formulation 1 of Table 1 and the compounding column in Table 3. Vulcanization and tests of physical properties were carried out in accordance with the conditions described in Example 1. In addition to tests at normal temperature (25° C.), hardness and tensile strength were tested at normal temperature after the test strips were maintained at 100° C. for 48 hours.

COMPARATIVE EXAMPLE 6

The tests were carried out in the same way as in Example 5 except that a material in which the $C_{IS}/O_{IS}$ ratio was 99/1 was used as the carbon fibril material and that the other conditions were those indicated in Table 3.

COMPARATIVE EXAMPLE 7

The tests were carried out in the same way as in Example 5 except that 75 parts of HAF carbon was used instead of carbon fibrils.

When Examples 5 and 6 were compared with Comparative Example 7, it was found that there was little change (deterioration) of hardness and tensile strength after maintenance at high temperatures when the carbon fibrils of this invention were used.

When Example 5 and Comparative Example 7 were compared, it was found that the carbon fibrils conferred hardness and tensile strength on vulcanized rubber equal to that with HAF carbon when compounded in two-fifths the quantity of the latter.

EXAMPLE 8

Using CC fibrils, films were cast from the formulations shown in the table below. The fibrils were first ultrasonically dispersed in the Triton solution, then the latex was added, followed by additional sonication. The mixture was then dried as a film, after which conductive paint stripes were applied for resistivity determination.

TABLE 4

All amounts are parts by weight

|  | CONTROLS | | TESTS | | | |
| --- | --- | --- | --- | --- | --- | --- |
|  | 1 | 2 | 1 | 2 | 3 | 4 |
| Water | 2000 | 2000 | 2000 | 2000 | 2000 | 2000 |
| Triton X-100[1] | — | 10 | 10 | 10 | 10 | 10 |
| BN Fibrils | | | — | 5 | — | 10 |
| CC Fibrils | | | 5 | — | 10 | — |
| Natural Rubber[2] | 100 | 100 | 100 | 100 | 100 | 100 |
| Resistivity, ohm-cm | ∞ | ∞ | 1.1 | 48 | 0.3 | 13 |

[1]Triton X-100 is a nonionic surface active agent manufactured by Rohm and Haas 2
[2]Added as 161 parts of 62% latex As can be seen, the rubber containing CC fibrils at 5 parts per hundred (Test 1) is 43 times more conductive than its BN counterpart (Test 2). At the 10 phr loadings (Tests 3 & 4), the conductivity ration is essentially unchanged. Accordingly, it was found that CC fibrils imparted electrical conductivity substantially more effectively than BN fibrils.

As described above, the rubber composition of this invention exhibits good roller processing capacity. Moreover, when the effects of the carbon fibrils of this invention and carbon black are compared for SBR rubber compositions, essentially the same physical properties in respect to hardness, tensile strength and wear can be obtained with carbon fibrils as with carbon black when the carbon fibrils are compounded in amounts of less than half the carbon black. Volumetric intrinsic resistance values are approximately 1/70th, with vulcanized rubber of high conductivity being obtained.

EXAMPLE 9

Surface modifications of fibrils were conducted. The gas-phase separation of geometric isomers of hydrocarbons such as xylenes requests a tough and strong polymer matrix for membrane formation which does not dissolve in hydrocarbon solvents.

One of favorable candidate polymers for this purpose would be Nylon since Nylons are stable and tough to hydrocarbon solvents. So, a target is aimed at Nylon as a matrix in which the fibrils are well dispersed.

In order to have a well-dispersed state of fibrils in Nylon, it would be necessary to modify the surface structure of fibrils through chemical modifications. A method for the surface modifications of fibrils was carried out by surface oxidation with nitric acid by the following procedure.

Fibrils were treated under following conditions:
Fibrils: 5 g
36% $HNO_3$: 70 ml in 200 mol flask
Heating: reflux at 110° for 5 hrs.

After the treatment fibrils were collected by filtration and washed with water, repeatedly and dried.

Surface structures of fibrils were characterized by ESCA analyses. The content of oxygen on the fibrils surface increased from 4.35% to 12.42%. It is expected that the increase of the oxygen content might be due to the formation —COOH group on the surface of fibrils.

EXAMPLE 10

Further studies on surface modification of fibrils by oxidation with nitric acid were carried out under various conditions so that carboxylic acid groups were incorporated onto the surface. At the initial stage of the oxidation ether-type oxygen was incorporated and then following oxidation reactions took place to produce carbonyl and carboxylic acid moieties.

Surface analyses by ESCA indicate that the incorporation of oxygen reached an equilibrium after 5 hr. treatment in 60% nitric acid at 110° C.

Surface modification of fibrils was carried out by means of oxidation with concentrated nitric acid so that carboxylic acid groups were introduced on the surface of fibrils. Oxidation reaction was carried out as follows: 10 g of fibrils were suspended in 200 ml of 60% nitric acid which were heated under reflux conditions at 110° C. During the reaction nitrogen dioxide gas was evolved which was neutralized with 5% aqueous potassium hydroxide solution. After a given time period of the reaction, the suspension was poured into 21 of water and the fibrils were filtered off. The oxidized fibrils were washed repeatedly with water, followed by washing with acetone and drying under vacuum at 50° C. Drying fibrils directly after washing with water yielded a crammed mass which was difficult to disperse. Therefore, the washing with acetone, followed by hexane was necessary to keep fibril structure.

Surface analyses of fibrils was carried out by means of ESCA(XPS), using JEOL Surface Science SSX-100, and also by means of elemental analyses.

Figure 2:
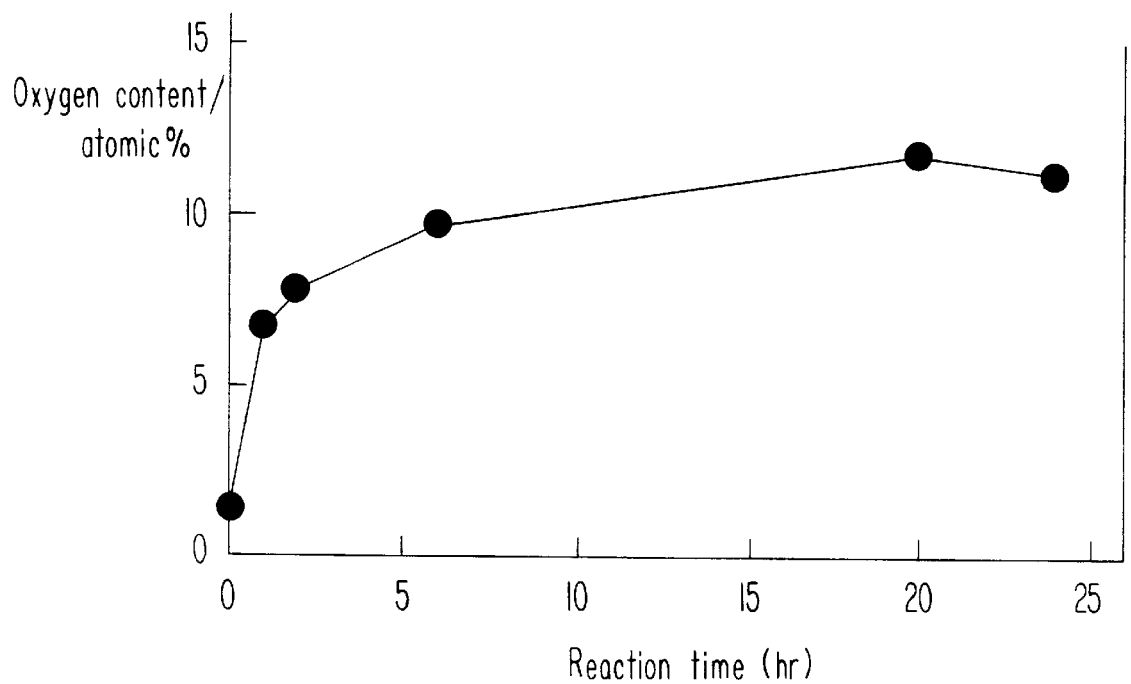
FIG. 2 shows the oxygen of fibril after oxidation.

FIG. 2 indicates the total oxygen content of fibrils after the oxidation. The initial content of oxygen of fibril was 1.4%, which increased gradually by the oxidation. The oxygen content of fibrils increased up to 6.8% after one hr oxidation and reached an equilibrium content of about 11% after ten hr.

Figure 3:
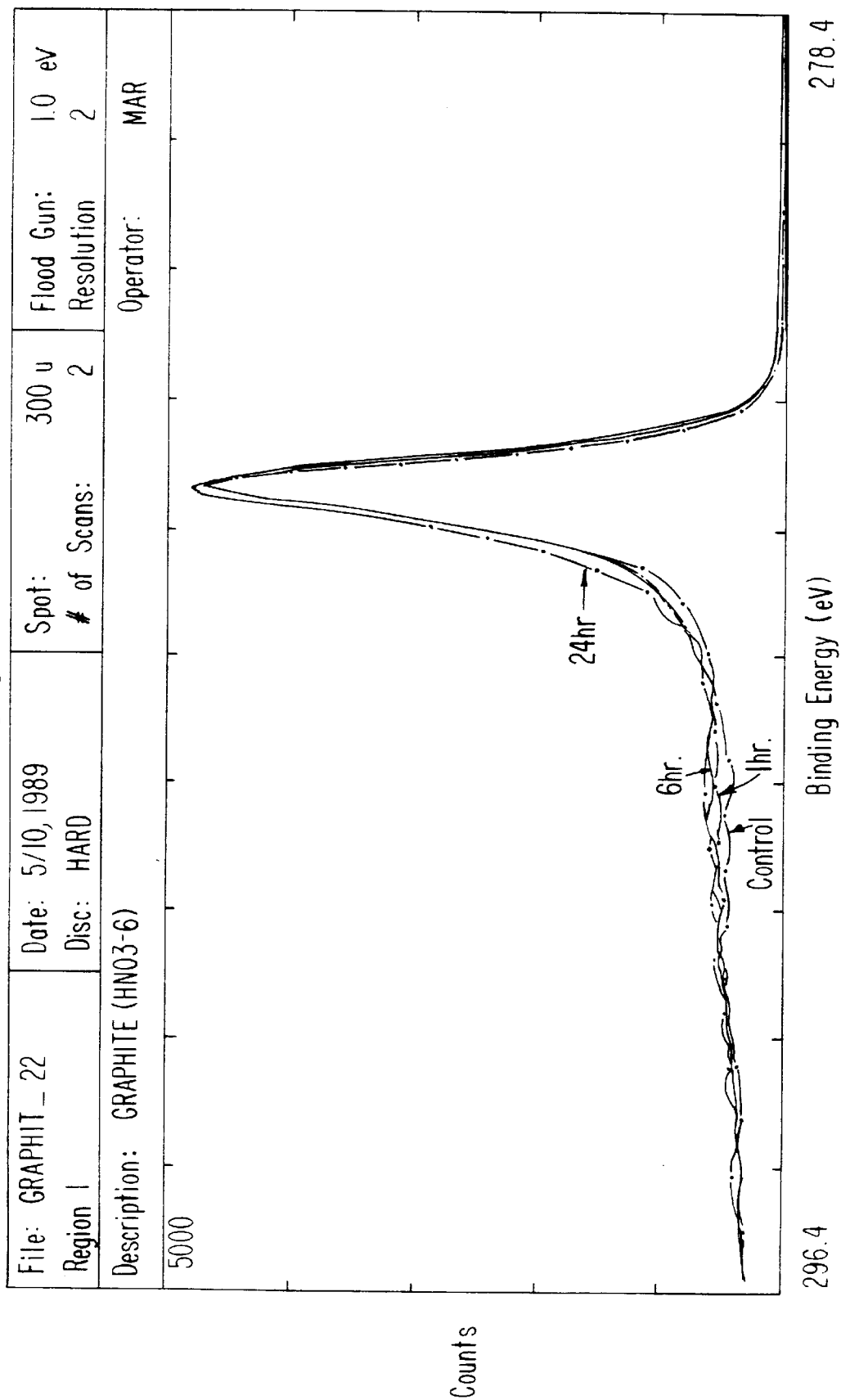
FIG. 3 shows the ESCA spectra of fibril oxidized by nitric acid in various time periods.
Figure 4:
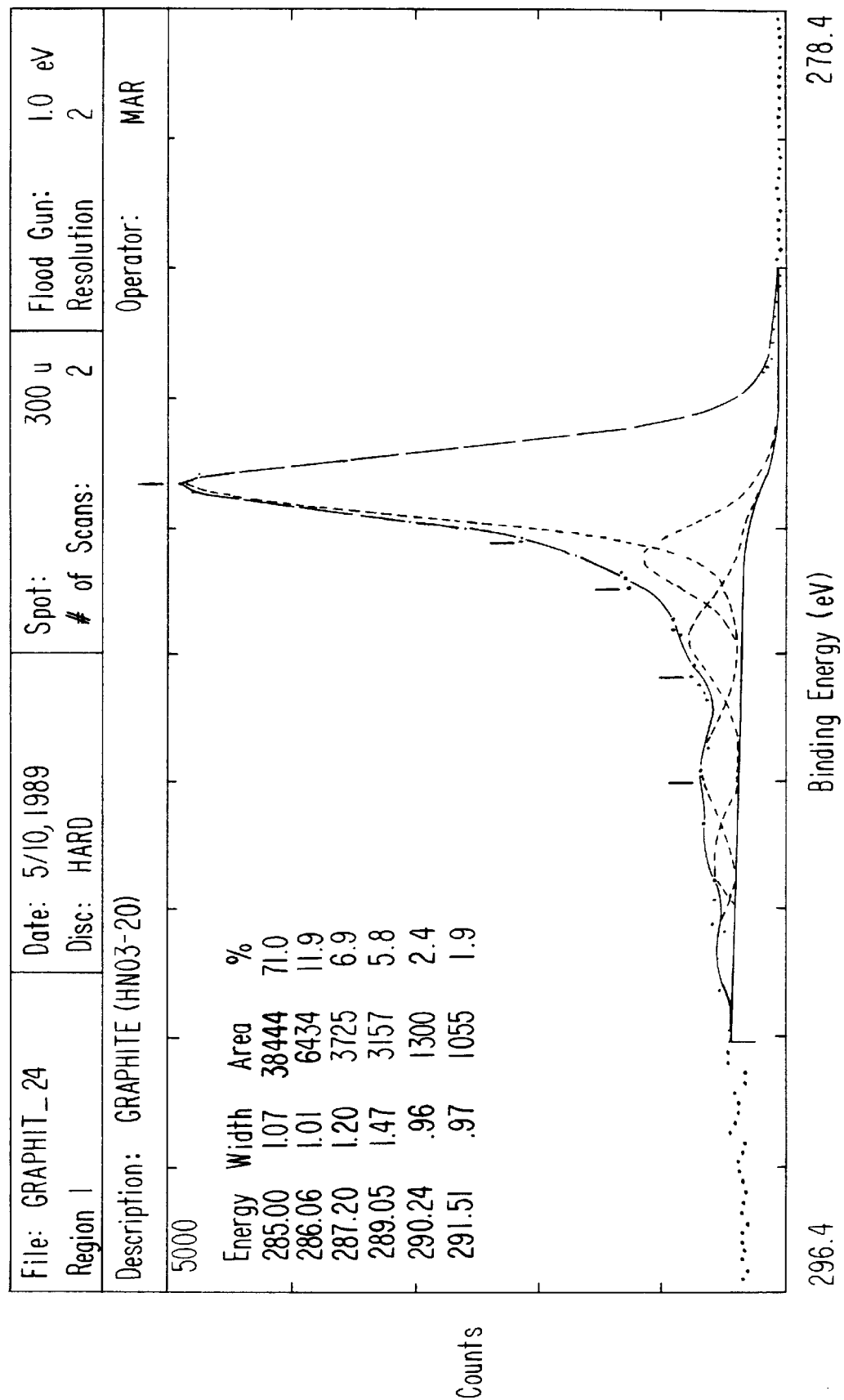
FIG. 4 shows the ESCA wave separations of C-1s for fibrils oxidized with nitric acid for 20 hours.
Figure 5:
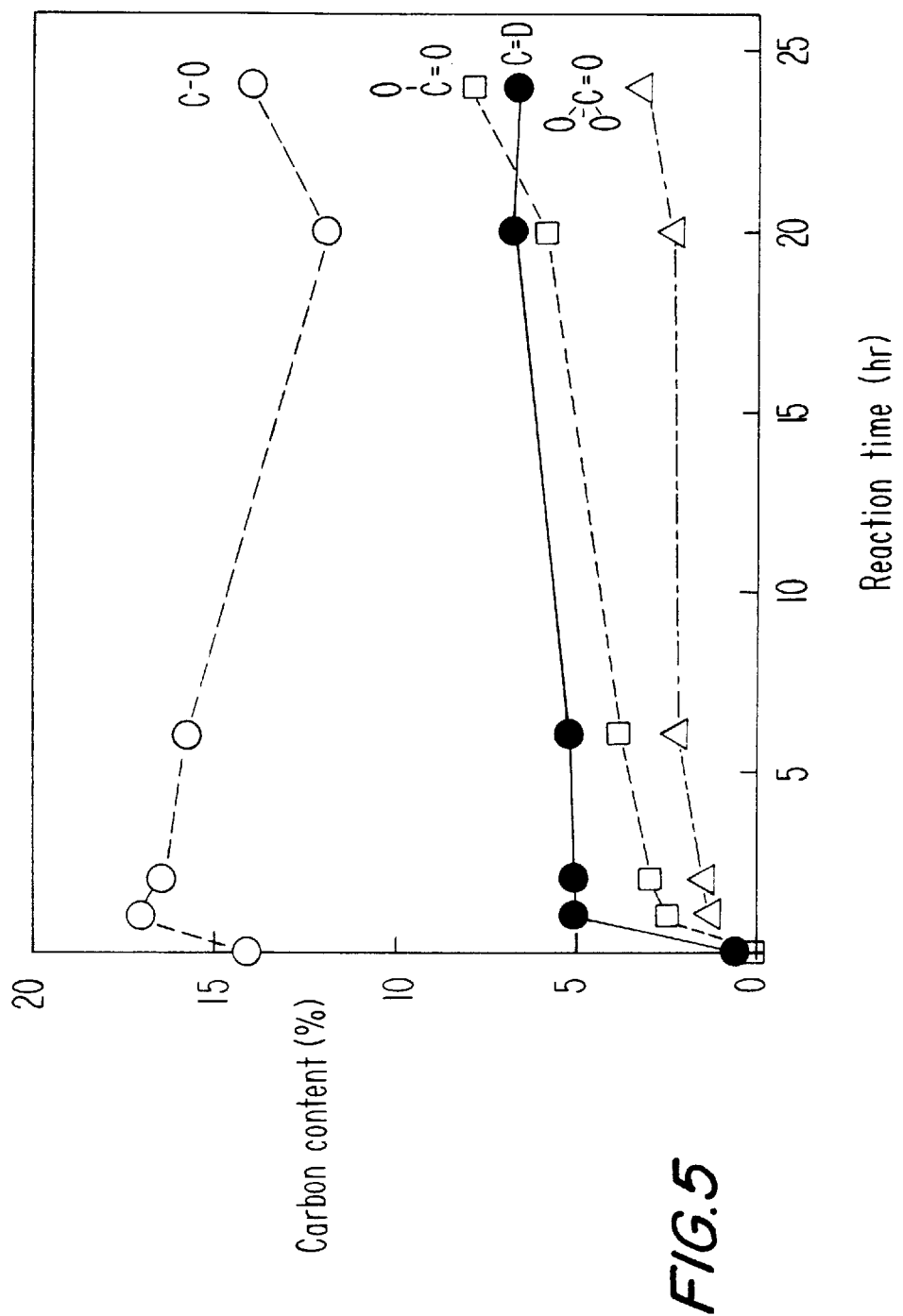
FIG. 5 shows the structures of oxygen-containing groups in fibrils.

Structural analyses of oxygen were carried out by C-1s wave analyses which are shown in FIGS. 3 and 4, as ESCA spectra. Results of the structures of oxygen are summarized in FIG. 5, which revealed that ether-type oxygen —O—C was observed at the initial state, followed by gradual increases in C=O and —COOH groups.

Presumably, peroxide groups would be formed at the initial stage of the oxidation on the surface of the fibrils, which then transformed into carbonyl and carboxylic acid groups.

Figure 6:
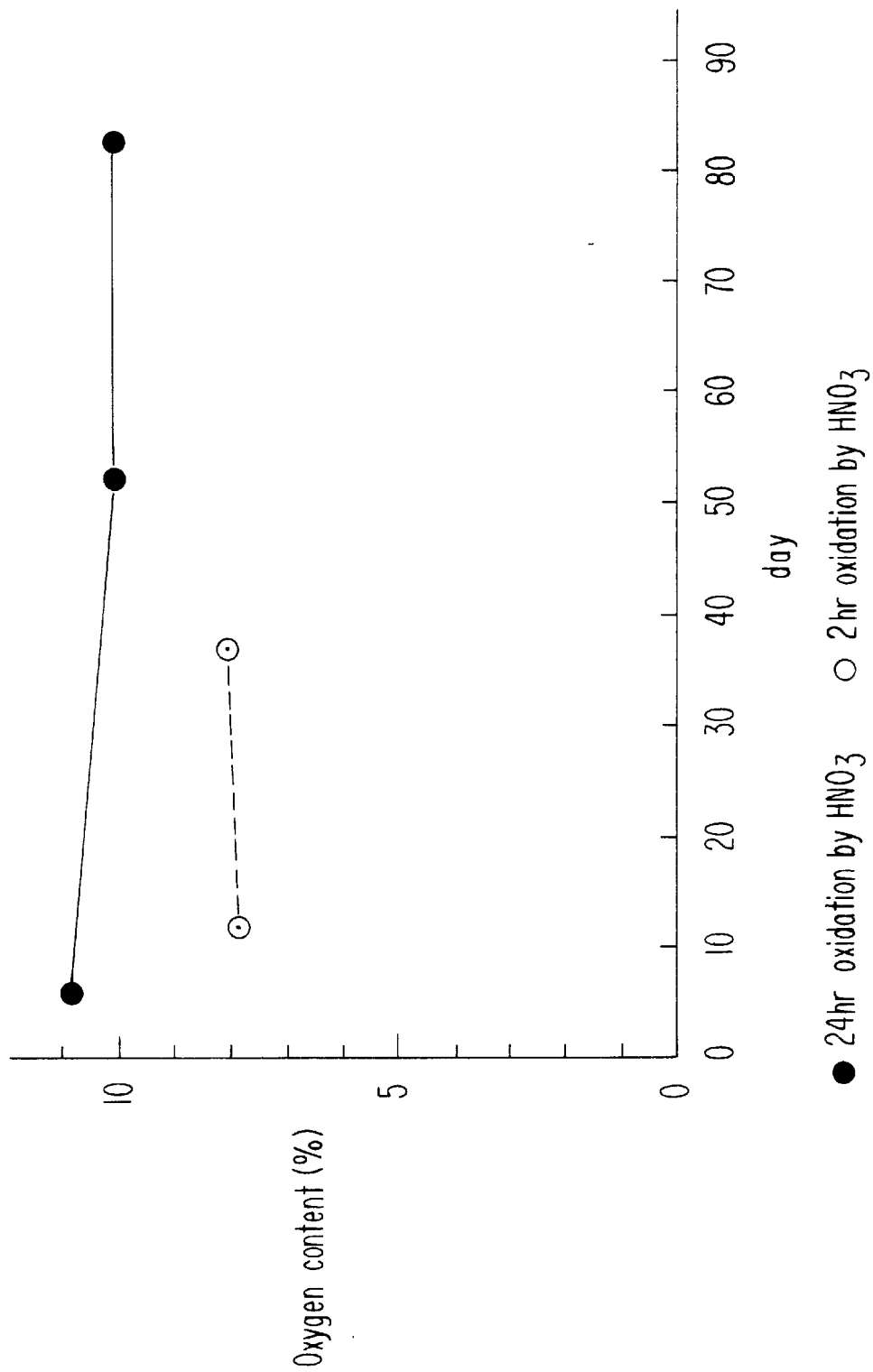
FIG. 6 shows the change of oxygen content of fibrils.

The oxygen contents and the structures of oxygen groups did not significantly change after keeping fibril for almost three months in air, as shown in FIG. 6.

EXAMPLE 11

Figure 7:
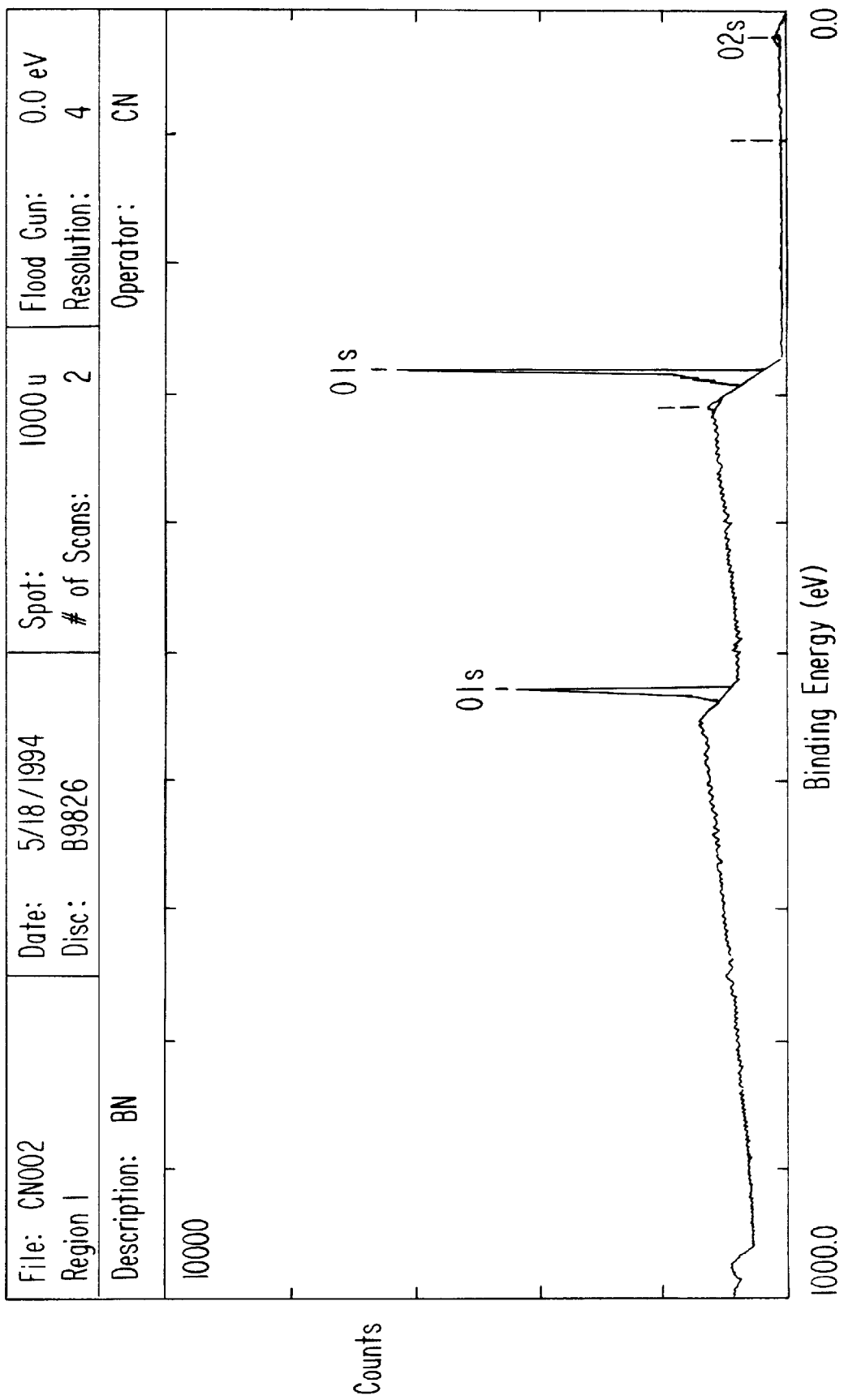
FIG. 7 shows an XPS spectrum of nitric acid oxidized BN fibrils.
Figure 8:
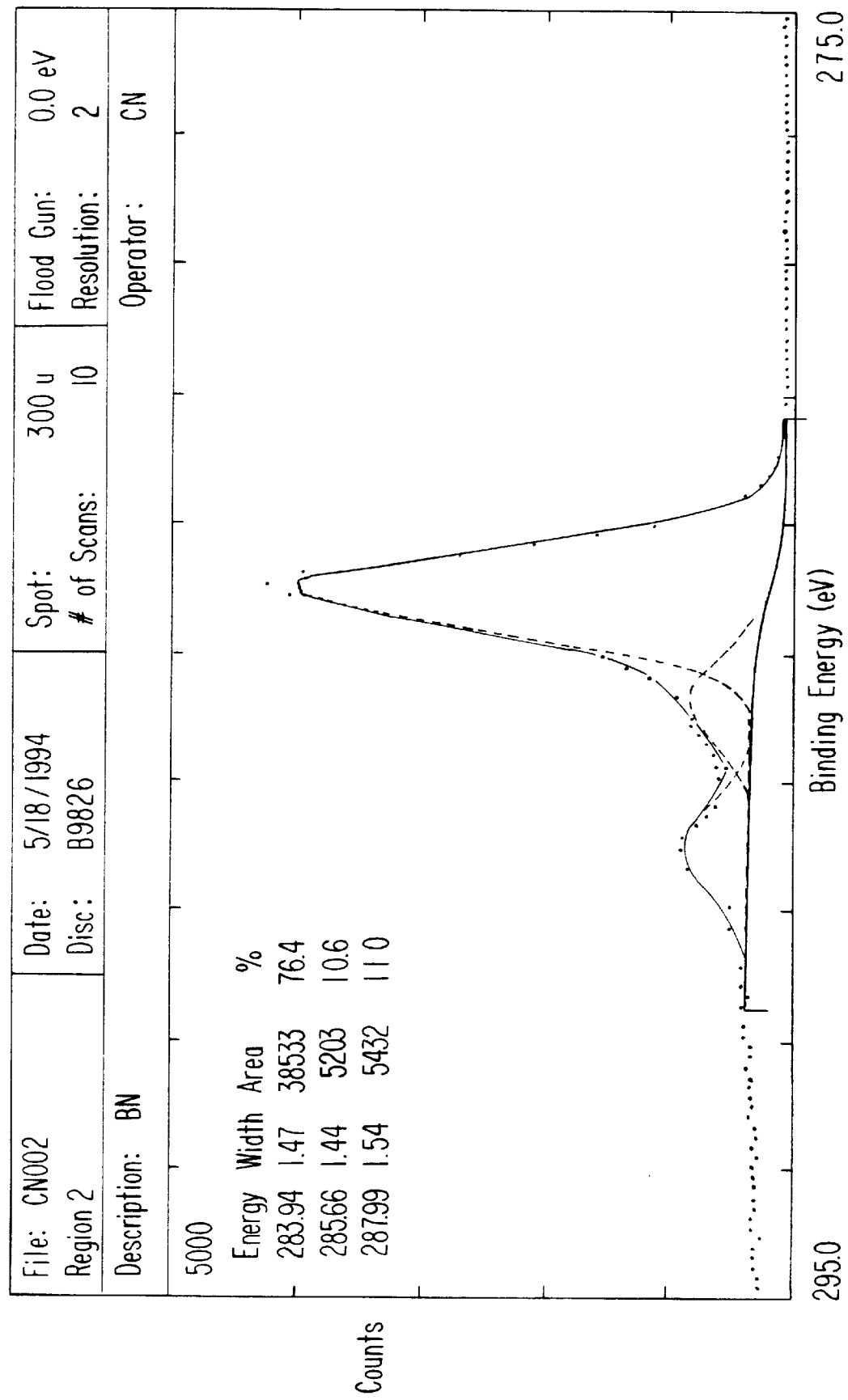
FIG. 8 shows a high resolution spectrum of the carbon 1s peaks in the spectrum of FIG. 7.

XPS spectrum was conducted on nitric acid oxidized fibrils. FIG. 7 is a XPS spectrum of nitric acid oxidized BN fibrils. It shows carbon 1s and oxygen 1s peaks. The calculated oxygen content from this spectrum is 20.6% (atomic percentage). The fibrils were oxidized in 35% nitric acid at 107° C. for 48 hours. FIG. 8 was recorded from the same sample. It is a high resolution spectrum of the carbon 1s peaks. The peaks at 283.94, 285.66 and 287.99 eV can be assigned to C, C—OH and COOH (C=O), respectively.

Rubber of high hardness can be obtained by means of the rubber composition of this invention without impairing processing capacity and rubber elasticity. Consequently, stability of properties can be maintained over long periods. The reason for this is that the rubber composition of this invention makes it possible to maintain hardness while decreasing the quantity of fillers and sulfur compounded for the purpose of increasing hardness.

Rubber compositions having sufficient hardness so that they can be used for radial tire treads of large vehicles while increase in heat generation by the rubber is avoided can be obtained more readily than with high reinforcing carbon black which is compounded for reinforcement.

When partially oxidized carbon fibrils are used, hardness, tensile strength and wear resistance are of the same degree as with carbon black when the quantity of carbon compounded is approximately two-fifths that with carbon black. Moreover, there is little thermal deterioration of the vulcanized rubber.

Thus, the rubber compositions of this invention satisfy performance requirements which have been becoming higher and higher in recent years, their performance as products is stable over long periods and they can be used effectively over an extremely broad range of industrial fields. For example, they can be used for automobile components, tire components, rubber rollers, rolling, pads and oil seals.

Having thus described in detail preferred embodiments of the present invention, it is to be understood that the invention defined by the appended claims is not limited to particular details set forth in this description as many variations thereof are possible without departing from the spirit or scope of the present invention.

What is claimed is:

1. A rubber composition containing carbon fibrils in which 0.5 to 60 parts by weight of carbon fibril material comprised primarily of an aggregate of fibrils having an average diameter of 0.05 to 50 $\mu$m in which fine, filiform carbon fibrils of 3.5 to 75 nm in diameter are intertwined with each other is mixed with 99.5 to 40 parts by weight of synthetic rubber and/or natural rubber.

2. A pneumatic tire in which the surface layer of the tire is provided with a rubber composition, wherein said rubber composition contains carbon fibrils in which 0.5 to 60 parts by weight of carbon material comprised primarily of an aggregate of fibrils having an average diameter of 0.05 to 50 $\mu$m in which fine, filiform carbon fibrils of 3.5 to 75 nm in diameter are intertwined with each other is mixed with 99.5 to 40 parts by weight of synthetic rubber and/or natural rubber.

* * * * *